United States Patent [19]
Bruel

[11] 3,890,774
[45] June 24, 1975

[54] GRAPE-GATHERING MACHINE

[76] Inventor: Alain Bruel, Domaine du Petit Chaumont, Aigues Mortes, France

[22] Filed: June 7, 1973

[21] Appl. No.: 367,903

[30] Foreign Application Priority Data
June 7, 1972 France............................. 72.21140

[52] U.S. Cl. ............................................. 56/330
[51] Int. Cl. ........................................... A01g 19/00
[58] Field of Search ............ 56/330, 331, 328, 327, 56/27.5

[56] References Cited
UNITED STATES PATENTS
| | | | |
|---|---|---|---|
| 3,439,482 | 4/1969 | Orton..................................... | 56/330 |
| 3,449,895 | 6/1969 | Pertics................................... | 56/333 |
| 3,636,688 | 1/1972 | Fontan et al........................... | 56/330 |
| 3,686,842 | 8/1972 | Littau.................................... | 56/330 |

Primary Examiner—Russell R. Kinsey
Attorney, Agent, or Firm—Sughrue, Rothwell, Mion, Zinn and Macpeak

[57] ABSTRACT

A grape gathering machine is provided in the two longitudinal travellers which are adapted to move away from or closer to each other. Swinging beater frames and swinging recovery frames are pivotally mounted on each of said travellers to define a pair of tunnels. The two tunnels enclose two adjacent rows of vine stocks from which the grapes are thus gathered simultaneously. The chassis of the machine may be raised and lowered between a road travel position and a grape gathering position respectively and may be supported solely by small intermediate auxiliary wheels to provide a small turning radius.

5 Claims, 7 Drawing Figures

PATENTED JUN 24 1975　　　SHEET 3　　　3,890,774

GRAPE-GATHERING MACHINE

The present invention relates to an agricultural machine of a new type, intended to gather the grapes of a vineyard.

Grape gathering machines are known, but they imply various drawbacks. As a general rule, a grape gathering machine of known type is constituted by a self-propelling machine, which treats a single row of vines at a time. Consequently, the machine sits astride of the row concerned, and the driver's seat lies several metres away from the ground, so that the driver cannot see well, and does not accurately appreciate what is going on under himself and around the machine. Moreover, the motor unit, which stands for a substantial part of the price of the machine, remains at rest and useless for more than eleven months each year, that is, from one gathering to the next one.

The grape gathering machines of known types have a further drawback, in that they are excessively cumbersome, so that it is necessary to provide a turning area of about five metres at either end of each row of vines to allow the machines to turn: in other words, a stretch of ground about five meter wide at either end of the vineyard must be bare and unplanted, which results obviously in a loss. Moreover, such turning area are not always feasible, owing to the shapes of some vineyards.

Another drawback is implied by the fact that a grape gathering machine of known type is not adjustable, in particular as regards the width thereof. Consequently, such a machine is suitable only for a vineyard, the rows of vines of which are set with a certain distance therebetween, but it cannot be used for a vineyard wherein the planting is different.

For all the above reasons, the grape gathering machines of known types are highly expensive and bulky: they are not suitable for all types of planting, and the rentability for the use thereof is doubtful.

The object of the present invention is to obviate the above drawbacks by providing a grape gathering machine of a new type, adapted to be built at a comparatively low price, while ensuring a high versatility of use, and facilitating the control of the operations.

A grape gathering machine according to the invention includes beater members disposed on either side of the stocks of a row of vines, and recovery members located under the vines, above the ground, and on either side of said row, and is characterized in that it appears as a frame intended to be hauled by a tractor, said frame being topped by two travellers disposed lengthwise, the runways of which are disposed transversely at the front and at the rear of the machine, while swingable frames in the shape of inverted U's are hanging from each longitudinal traveller, the plane of each "U" being disposed transversely of the machine, and said swingable frames being of two kinds, namely:

swingable frames carrying the beater members which are capable of acting on either side of a row of vine stocks, and swingable frames carrying recovery and sealing members capable of moving flush with the ground and making way for each vine stock, while ensuring the tightness of the space surrounding each successive vine stock in a same row. Additionally means are provided for recovering and discharging the produce gathered and fallen on the recovery members.

According to another feature of the invention, means are provided for adjusting the distance between the two longitudinal travellers by moving them on their transverse runways, said means enabling the two travellers to be kept symmetrical with respect to the longitudinal vertical plane of the machine, whatever said distance may be.

According to another feature of the invention, the front of the chassis which carries the machine is fitted with a strut, which allows coupling said chassis to a tractor, the latter moving forward, therefore, between those two rows of vine stocks from which the machine gathers the grapes.

According to an additional feature of the invention, the rear part of the chassis carries wheels, the height of the axle of which is adjustable by means enabling said chassis:

either to be lowered to put the chassis in a low working position, or to be raised to put the chassis in a high transport position.

According to another feature, the central part of the chassis carrying the machine carries an axle provided with two small relieving wheels on a level with the centre of gravity of the machine, so as to make the raising or lowering of the rear axle of the chassis easier. Additionally, said small wheels allow, reduction of the turning radius of the machine, this being particularly useful at the ends of the vine rows.

According to another feature of the invention, each traveller is constituted by a longitudinal central shaft, which is used as an axis of rotation for the swingable recovery or beater frames hanging therefrom.

According to another feature of the invention, the rear part of the machine includes a driving station from which an operator actuates control means for centring the swingable beater and recovery frames which lie in front of him, said frames defining all together two tunnels which enclose or surround the two rows of vine stocks between which the machine is hauled forward by the tractor. As a result of this arrangement, the operator seated on the rear driving seat enjoys a very good visibility, so that he is able to centre the two tunnels accurately over the two rows from which the grapes are to be gathered.

According to a further feature of the invention, the rear driving station includes:

a seat for the operator;

a control desk ensuring the control of all the drives and adjustments to be made during the work;

a hydraulic power station lying rearward of said seat and on either side of the latter to control all the hydraulic engines or jacks of the machine, the motor pump unit of said station being driven through a mechanical linkage connected to the power outlet on the tractor.

The appended drawing, which is given by way of non-limiting example, will enable the features of the invention to be understood more clearly.

The drawings illustrate an agricultural tractor 1 of a known type, which hauls a grape gathering machine 2 according to the invention. Said machine includes a chassis 3, the front part of which is adapted to be attached to the tractor 1 through a strut or draw-bar 4.

Figure 2:
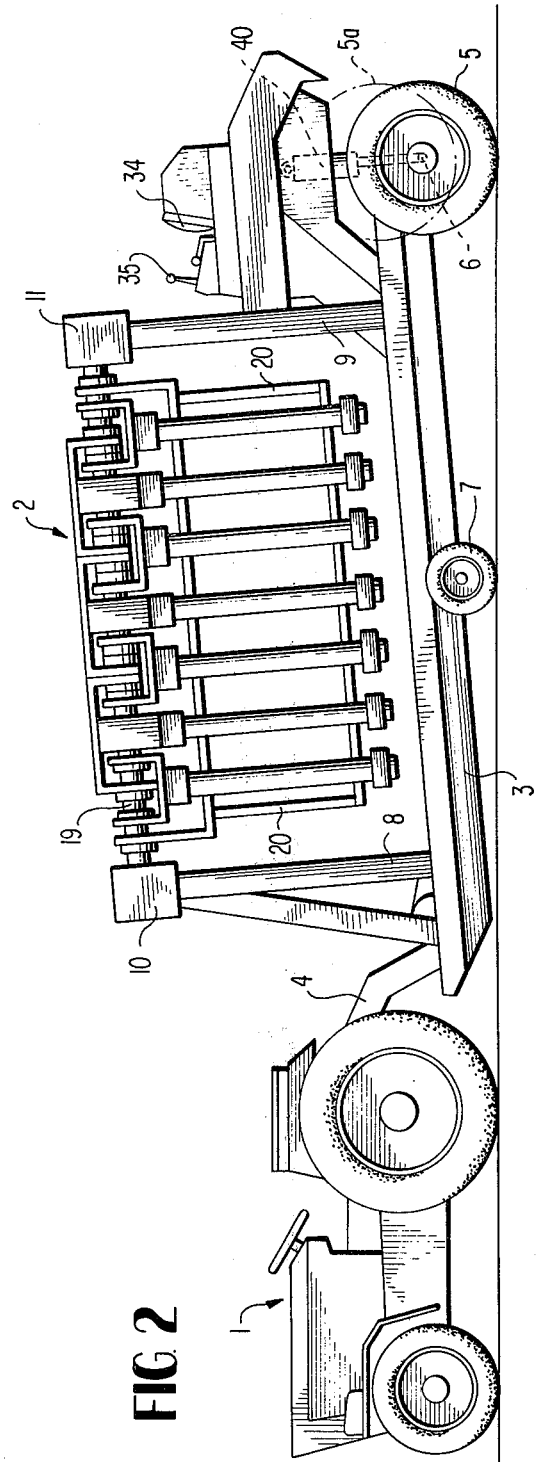
FIG. 2 is a similar view of said machine in an intermediate position.

The rear part of the chassis 3 is carried by wheels 5, the axle 6 of which includes hydraulic jack means 4. which enable said wheels to be shifted from their position shown in full lines in FIG. 2 to the position 5a shown in dotted lines in said Figure.

Figure 3:
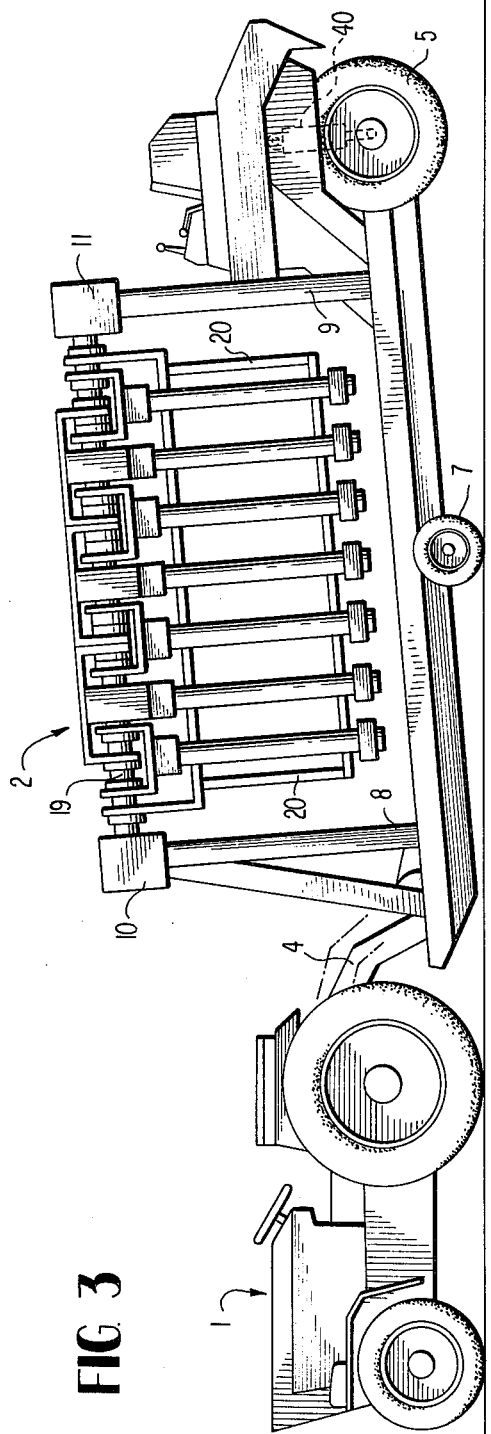
FIG. 3 shows said machine in position for taking a short bend.
Figure 4:
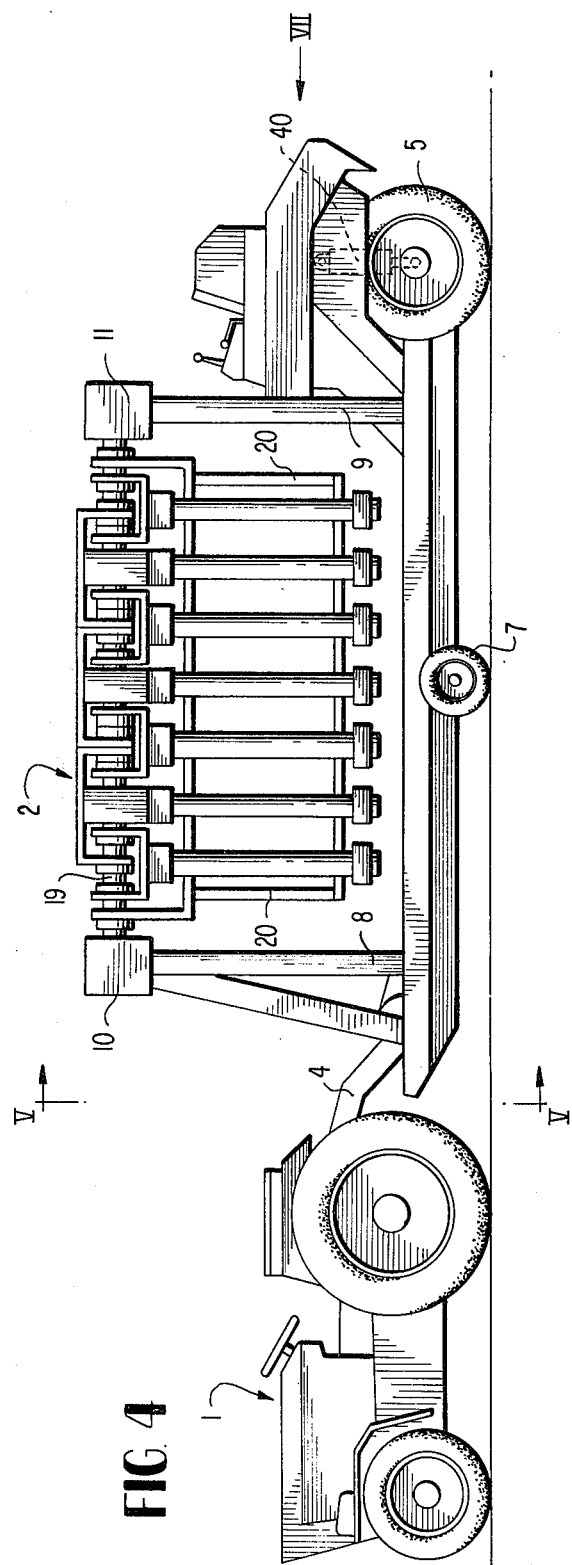
FIG. 4 shows the machine in working position.

Lastly, the central part of the chassis 3 is provided with two small auxiliary wheels 7, which rest on the ground only when the machine is in one of the intermediate positions illustrated in FIGS. 2 and 3, or in the working position shown in FIG. 4.

Figure 1:
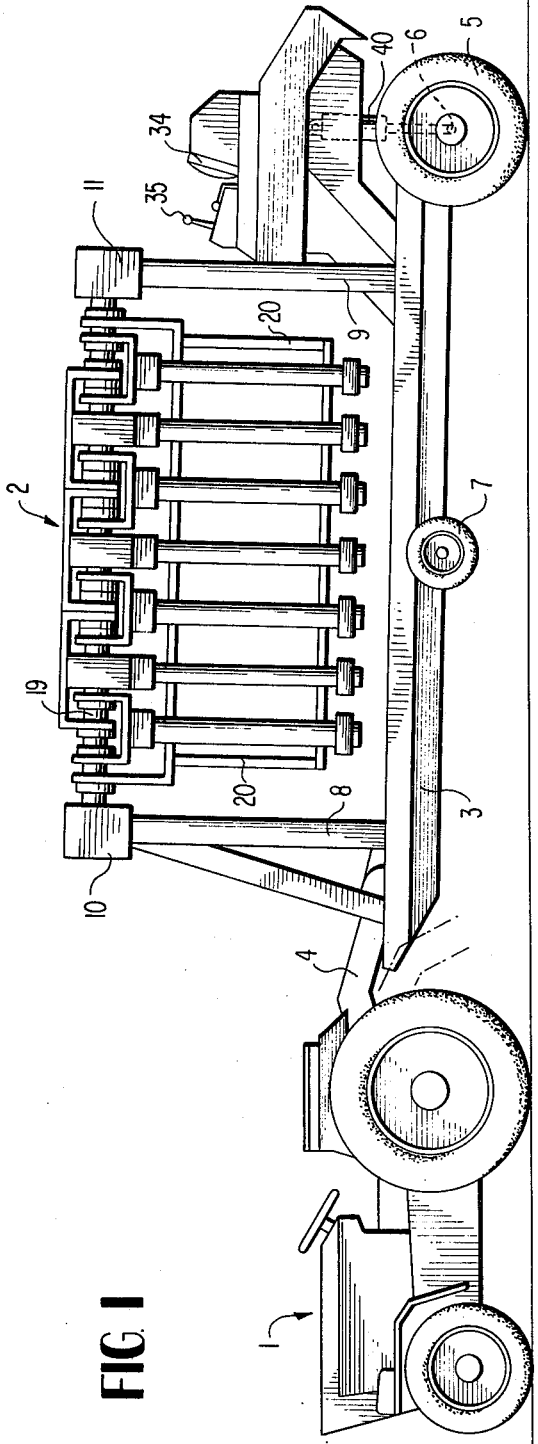
FIG. 1 is a side view of the grape gathering machine according to the invention, in the position wherein it is transported on a road.

The chassis 3 is surmounted by a front gantry 8 and a rear gantry 9 (FIG. 1). The upper part of the gantry 8 is provided with a transverse runway 10, while a transverse runway 11 is likewise provided on the rear gantry 9.

Figure 5:
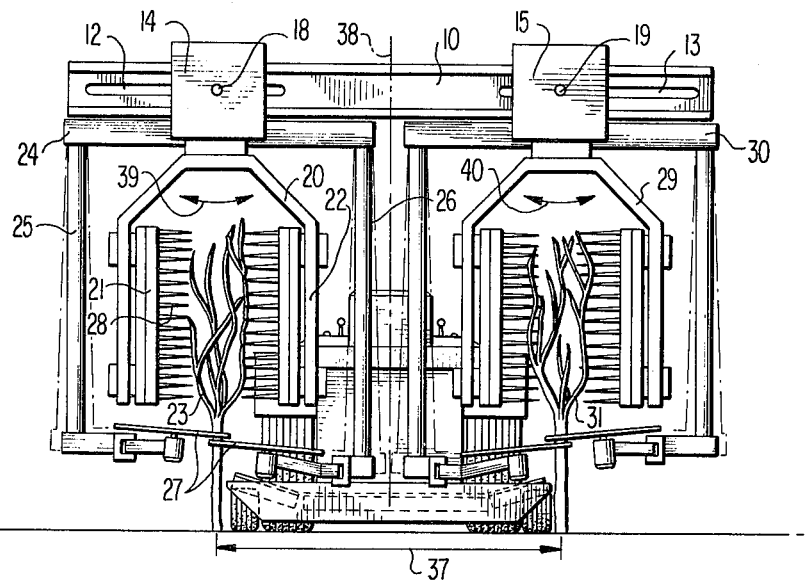
FIG. 5 is a sectional view along line V—V of FIG. 4, showing the front part of the assembly, with the travellers spaced apart to a minimum.

The front runway 10 includes two guiding rails 12 and 13, on which the respective carriages 14 and 15 run (FIG. 5).

Figure 7:
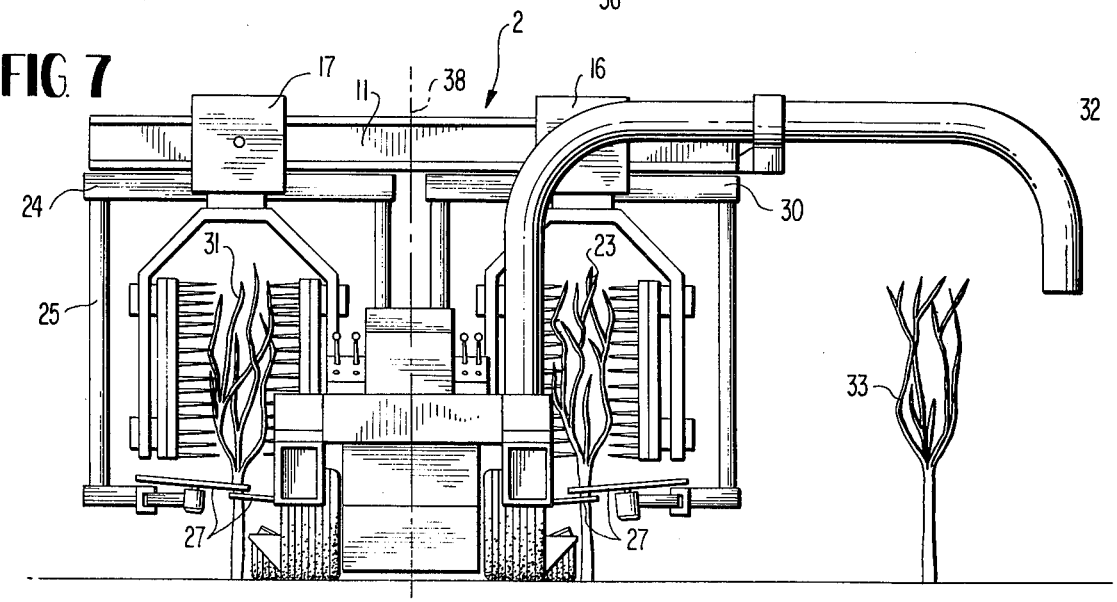
FIG. 7 is a view of the rear part of the machine, as seen in the direction of the arrow VII of FIG. 4.

Carriages 16 and 17 are likewise capable of moving closer to and away from each other on the rear runway 11 (FIG. 7).

The carriages 14 and 16 are connected to each other by a traveller constituted by a longitudinal shaft 18. A longitudinal shaft or traveller 19 connects likewise the carriages 15 and 17.

Two kinds of swingable frames are hanging from the traveller 18, namely:

swingable beater frames 20, each of which is in the shape of an inverted "U" which defines two vertical arms 21 and 22 adapted to pass on either side of a row of vine stocks 23;

a series of swingable frames 24, each of which is likewise in the shape of an inverted U, the vertical arms 25 and 26 of which carry lower recovery and sealing members 27.

The U-shaped swingable frames 20 are directed according to a transverse plane with respect to the machine, and are provided with beater members 28, which act on every vine stock 23 to cause the grapes to fall therefrom onto the recovery members 27.

It will be seen that the whole of the beater frames 20 and recovery frames 24 hanging from the traveller 18 define a kind of tunnel which surrounds or encloses a row of vine stocks 23 and moves along said row (FIG. 5).

In a similar way, the beater frames 29 and the recovery frames 30 hanging from the traveller 19 define a kind of tunnel which surrounds or encloses the vine stocks 31 of the adjacent row and works on the latter.

As a result of the above arrangement, it will be seen that the tractor 1 and the grape gathering machine 2 according to the invention run between the two rows 23 and 31, while the grapes gathered are discharged through a duct 32 beyond a further row of vine stocks 33 (FIG. 7). A suitable receptacle (not shown) is thus able to run easily between two rows which are not occupied by the grape gathering machine 2.

Figure 6:
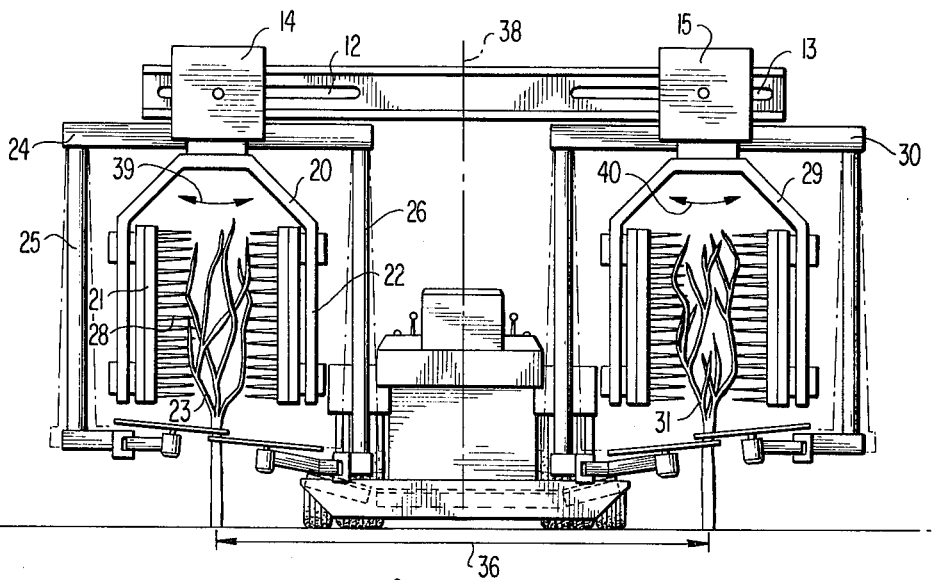
FIG. 6 is a view similar to FIG. 5, but with the travellers spaced apart to a maximum.

A driver's seat 34 is disposed at the rear of said machine 2, above the axle 6. The operator of the machine operates control means 35 for adjusting the space between the two travellers 18 and 19 according to the distance between the vine rows. This enables him, therefore, to pass through vineyards the rows of which are separated by any distance ranging from the maximum spacing 36 as shown in FIG. 6 to the minimum spacing 37 as shown in FIG. 5. The control means for varying the spacing between the travellers 18 and 19 on their runways 10 and 11 are designed in a manner such that said travellers remain always symmetrical with each other with respect to the median vertical plane 38 of the whole machine.

The operation is as follows:

In its position of transport on a road (FIG. 1) the grape gathering machine runs by means of its rear wheels 5 only, while its intermediate wheels 7 are carried above the ground.

By acting on the draw-bar 4 (FIG. 2) by means of a conventional hydraulic lift on the tractor the operator is able to lower the front part of the machine, and lay the intermediate wheels 7 on the ground. The rear wheels 5 are then released, and can be raised to the position 5a. This is made possible, in particular, by the fact that the centre of gravity G of the whole of the machine 2 lies substantially on a level with the intermediate wheels 7 (FIG. 2).

After the wheels 5 being raised by means of jacks 40, the grape gathering machine 2 rests on the ground only by means of the intermediate wheels 7 (FIG. 3). It will be seen that in said position the turning radius of the assembly is very small, since the pivoting takes place about said wheels 7.

By acting again on the draw-bar 4, the operator is able to bring back the intermediate wheels 7 and the wheels 5 (still raised) onto the ground simultaneously, whereby the machine is brought to the working position illustrated in FIGS. 4 to 7.

With the chassis 3 thus brought back to the horizontal, the tractor 1 and the machine 2 move forward between two rows of vine stocks 23 and 31 which are treated simultaneously. The operator at the rear driving station 34 is sitting at a small distance from the ground between the two rows of vine stocks 23 and 31, whereby he enjoys excellent visibility and is able to adjust the machine depending on the topographic nature of the ground and the shape of the vineyard. Moreover, all the swingable frames of each "tunnel" can swing freely under the travellers 18 and 19, as indicated in FIG. 5 by the double arrows 39 and 40. Such possibility for the two tunnels to swing is a further factor which makes it easier to adapt the machine according to the invention to vineyards having different planting patterns.

I claim:

1. A grape gathering machine comprising a wheeled chassis, draw bar means for connecting said chassis to a tractor, a front gantry and a rear gantry mounted on said chassis transversely of the longitudinal axis of the chassis, a pair of parallel spaced apart travellers adjustably mounted between said front and rear gantries, adjusting means for varying the spacing between said travellers and a first and second plurality of inverted U-shaped frame means pivotally suspended from said travellers to define two tunnels adapted to surround two rows of vines simultaneously, said first frame means having beater means thereon and said second frame means having recovery means thereon.

2. A grape gathering machine as set forth in claim 1 wherein said draw-bar means is mounted at the front central portion of the chassis so that the tractor to which said draw-bar means is adapted to be connected will move between those two rows of vines from which the machine gathers the grapes simultaneously.

3. A grape gathering machine as set forth in claim 1 wherein said wheeled chassis is provided with a pair of rear wheels having interconnecting axle means and means for adjusting the distance between said chassis and said axle means.

4. A grape gathering machine as set forth in claim 3 further comprising additional axle means transversely disposed on the central portion of said chassis and two auxiliary wheels smaller than said rear wheels being rotatably mounted on said additional axle means.

5. A grape gathering machine as set forth in claim 3 further comprising a driving station mounted on the rear of said chassis, said driving station comprising a seat for an operator, a control panel and hydraulic power means.

* * * * *